United States Patent
Ho et al.

(10) Patent No.: US 12,061,414 B2
(45) Date of Patent: Aug. 13, 2024

(54) LASER LIGHTING SYSTEM

(71) Applicant: DELTA ELECTRONICS, INC., Taoyuan (TW)

(72) Inventors: Chi-Yin Ho, Taoyuan (TW); Ming-Yu Chang, Taoyuan (TW); Yuan-Ming Hsu, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 0 days.

(21) Appl. No.: 17/822,804

(22) Filed: Aug. 29, 2022

(65) Prior Publication Data
US 2023/0266651 A1 Aug. 24, 2023

(30) Foreign Application Priority Data
Feb. 24, 2022 (CN) .......................... 202210172297.4

(51) Int. Cl.
*G03B 21/20* (2006.01)
*G03B 21/16* (2006.01)

(52) U.S. Cl.
CPC ........... *G03B 21/204* (2013.01); *G03B 21/16* (2013.01); *G03B 21/206* (2013.01)

(58) Field of Classification Search
CPC ..... G03B 21/204; G03B 21/16; G03B 21/206
USPC ......................................................... 353/31
See application file for complete search history.

(56) References Cited

U.S. PATENT DOCUMENTS

| | | | |
|---|---|---|---|
| 9,544,554 B2 | 1/2017 | Murai | |
| 2018/0249137 A1* | 8/2018 | Kobayashi | ............. H04N 9/312 |
| 2020/0319540 A1* | 10/2020 | Kato | .................... G03B 21/204 |
| 2022/0260241 A1* | 8/2022 | Iizawa | .................. F21V 29/502 |

FOREIGN PATENT DOCUMENTS

| | | |
|---|---|---|
| CN | 108073023 A | 5/2018 |
| TW | 200734681 A | 9/2007 |
| TW | 201344335 A | 11/2013 |
| TW | I446095 B | 7/2014 |
| TW | I592733 B | 7/2017 |

* cited by examiner

*Primary Examiner* — Jerry L Brooks
(74) *Attorney, Agent, or Firm* — CKC & Partners Co., LLC (57) ABSTRACT

The disclosure provides a laser lighting system. The laser lighting system includes a microcontroller, a motor, a fluorescent color wheel and a detection circuit. The motor drives the fluorescent color wheel to rotate. The detection circuit is configured to detect a detected signal from the fluorescent color wheel. When a synchronous signal changes, the microcontroller compares the detected signal to the synchronous signal, in order to control the output current signal for driving the motor, and to decrease the phase variation between the detected signal and the synchronous signal until the phase difference between the detected signal and the synchronous signal maintain at a constant value.

12 Claims, 4 Drawing Sheets

LASER LIGHTING SYSTEM

RELATED APPLICATIONS

This application claims priority to China Application Serial Number 202210172297.4, filed Feb. 24, 2022, which is herein incorporated by reference.

BACKGROUND

Field of Invention

The disclosure relates to a laser lighting system, particularly to a laser lighting system related to a digital projection technique.

Description of Related Art

In nowadays digital projection techniques, the power of the laser light source is rapidly increased, in order to improve the brightness of the projection image. During the operation period, the laser light source with the relatively large power may penetrate the fluorescent color wheel. To avoid the fluorescent color wheel being penetrated, the fluorescent color wheel is usually equipped with a heat dissipation structure (such as, a fin structure). However, the equipment of the heat dissipation structure may cause an increase in the weight on the fluorescent color wheel, and the driving motor corresponding to the fluorescent color wheel needs to be provided with larger voltage and current to rotate the fluorescent color wheel. In additional, a projector can be composed by more number of fluorescent color wheels, so as to increase the brightness of the projection image. Therefore, how to control the rotation speed of each fluorescent color wheels and color filter wheel under the aforementioned conditions without phase error between themselves which may result a negative impact to the projection image, and to improve the control efficiency for the fluorescent color wheels and color filter wheel are important issues in this field.

SUMMARY

One embodiment of the present disclosure provides a laser lighting system. The laser lighting system includes a processor, a microcontroller, a first motor and a first motor driving circuit. The processor is configured to provide a synchronization signal. The first motor is configured to drive a fluorescent color wheel to rotate. The microcontroller controls the first motor to generate a first output current signal, according to a frequency of the synchronization signal, to the first motor, and wherein the first motor drive the fluorescent color wheel to rotate according to the first output current signal. The first detection circuit is configured to detect a first detection signal form the fluorescent color wheel according to rotation of the fluorescent color wheel. When the frequency of the synchronization signal changes, the microcontroller control the first motor driving circuit to adjust the first output current signal, to maintain a ratio of the frequency of the synchronization signal to a value of the first detection signal at a constant value.

The other embodiment of the present disclosure provides a laser lighting system. The laser lighting system includes a microcontroller, a plurality of motors, a plurality of motor driving circuits and a plurality of detection circuit. The motors are configured to respectively drive a plurality of fluorescent color wheels and a color filter wheel to rotate. The microcontroller respectively controls the motor driving circuits to generate a plurality of output current signals to the motors according to a frequency of a synchronization signal, and wherein the motors respectively drive the fluorescent color wheels and the color filter wheel to rotate according to the output current signals. The detection circuit is configured to respectively detect a plurality of detection signals from the fluorescent color wheels and the color filter wheel according to rotation of each fluorescent color wheels. When the frequency of the synchronization signal changes, the microcontroller controls the motor driving circuits to adjust the output current signals to maintain a ratio of the frequency of the synchronization signal to a value of each detection signals at a constant value.

In summary, the microcontroller in the laser lighting system of the present disclosure compares the synchronization signal to the first detection signal when the synchronization signal changes, so as to control the output current signal for driving the motor, and to reduce the phase error between the first detection signal and the synchronization signal until the phase difference of the first detection signal and the synchronization signal is maintained at the constant value.

DETAILED DESCRIPTION

The following embodiments are disclosed with accompanying diagrams for detailed description. For illustration clarity, many details of practice are explained in the following descriptions. However, it should be understood that these details of practice do not intend to limit the present disclosure. That is, these details of practice are not necessary in parts of embodiments of the present disclosure. Furthermore, for simplifying the diagrams, some of the conventional structures and elements are shown with schematic illustrations.

The terms used in this specification and claims, unless otherwise stated, generally have their ordinary meanings in the art, within the context of the disclosure, and in the specific context where each term is used. Certain terms that are used to describe the disclosure are discussed below, or elsewhere in the specification, to provide additional guidance to the practitioner skilled in the art regarding the description of the disclosure.

It will be understood that, although the terms "first," "second," etc., may be used herein to describe various elements, these elements should not be limited by these terms. These terms are used to distinguish one element from another. For example, a first element could be termed a second element, and, similarly, a second element could be termed a first element, without departing from the scope of the embodiments.

In this document, the term "coupled" may also be termed "electrically coupled," and the term "connected" may be termed "electrically connected." "Coupled" and "connected" may also be used to indicate that two or more elements cooperate or interact with each other. In the following description and in the claims, the terms "include" and "comprise" are used in an open-ended fashion, and thus should be interpreted to mean "include, but not limited to." As used herein, the term "and/or" includes any and all combinations of one or more of the associated listed items.

Figure 1:
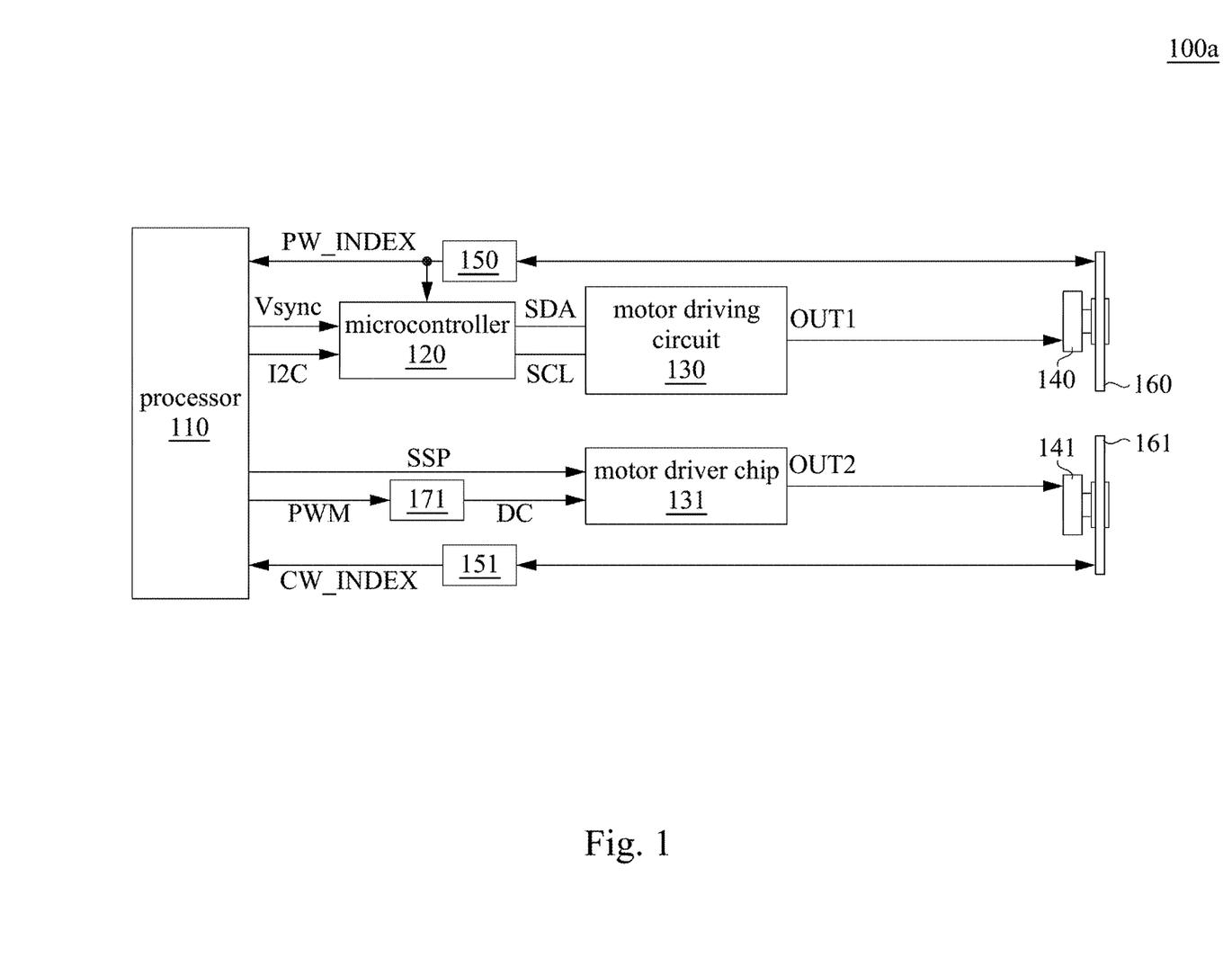
FIG. 1 is a schematic diagram of a function block of a laser lighting system in accordance with one embodiment of the present disclosure.

A description is provided with reference to FIG. 1. FIG. 1 is a schematic diagram of a function block of a laser lighting system 100a in accordance with one embodiment of the present disclosure. As shown in FIG. 1, the laser lighting system 100a includes a processor 110, a microcontroller 120, a motor driving circuit 130, a motor driver chip 131, motors 140 and 141, a fluorescent color wheel 160, a color filter wheel 161, detection circuits 150 and 151 and resistor-capacitor circuit 171.

In some embodiments, the laser lighting system 100a can be implemented by a digital projection including a digital micro-mirror device. The aforesaid digital projection is usually utilized incident laser to the fluorescent color wheel to excite light with color different from the laser light source. In some embodiments, since the power of the laser light source (such as a blue-light laser) increases, the temperature at the surface of the fluorescent color wheel will be greatly increased when the laser spot hits the fluorescent color wheel. Excessive heat on the surface of the fluorescent color wheel will cause the phosphor powder to burn black, which may result a negative impact to the brightness of the projection image, and even burning through the substrate of the fluorescent color wheel.

Therefore, in order to decrease the surface temperature at the fluorescent color wheel, the fluorescent color wheel 160 of the present disclosure can be equipped with various heat dissipation structures, such as fin structure or heat dissipation structure. The equipped heat dissipation structures on the fluorescent color wheel may result in an increase in the weight, which can be driven at 12 volts with a maximum instantaneous current of 1.5 ampere of a motor corresponding to the fluorescent color wheel. When the weight/load of the fluorescent color wheel is too heavy or the ambient temperature is too low to be driven in normal, it may cause stall and burns through the fluorescent color wheel.

The laser lighting system 100a utilizes the motor driving circuit 130 with a high power output capability to provide the output current signal with a relatively large voltage to the motor 140 in order to drive the fluorescent color wheel 160 which is heavier than the color filter wheel 161. In some embodiments, the color filter wheel 161 is lighter than fluorescent color wheel 160. For example, the microcontroller 120 is utilized to control the motor driving circuit 130 to provide the output current signal OUT1 with 24, 36 or 14 volts, to drive the motor 140. In some embodiment, the voltage value of the output current signal OUT1 can be a multiple of the voltage value of the output current signal OUT2.

The fluorescent color wheel 160 is configured to generate at least one color of the excitation light, and the color filter wheel 161 is configured to filter out the desired color from the excitation light. Under the condition that the fluorescent color wheel 160 is heavier than the color filter wheel 161, there may cause poor synchronization between the fluorescent color wheel 160 and the color filter wheel 161 when the fluorescent color wheel 160 and the color filter wheel 161 are driven by the motor driving circuit 130 and motor driver chip 131, respectively. Therefore, how to improve the synchronization between the fluorescent color wheel 160 and the color filter wheel 161 will be describe in detailed in the following embodiments.

In some embodiments, the processor 110 can be implemented by digital light processing processor, and the processor 110 is configured to generate and provide/output a synchronization signal Vsync.

In structure, the processor 110 is electrically coupled to the microcontroller 120. In some embodiments, the processor 110 can communicate with the microcontroller 120 through the serial interface I2C, such as universal serial bus. In function, the processor 110 provides the synchronization signal Vsync to the microcontroller 120.

In structure, the microcontroller 120 is electrically coupled to the motor driving circuit 130 through a serial data line SDA and a serial clock line SCL, and the motor driving circuit 130 is configured to drive the motor 140. In function, in response to the synchronization signal Vsync, the microcontroller 120 controls the motor driving circuit 130, through the serial data line SDA and the serial clock line SCL, to provide the output current signal OUT1 to the motor 140, and the motor 140 can drive the fluorescent color wheel 160 to rotate according to the output current signal OUT1.

In structure, the detection circuit 150 is electrically coupled to the processor 110 and the microcontroller 120. In function, the detection circuit 150 is configured to detect the first detection signal PW_INDEX from the fluorescent color wheel 160 according to the rotation of the fluorescent color wheel 160, and the detection circuit 150 transmits the first detection signal PW_INDEX to the microcontroller 120 and the processor 110.

The microcontroller 120 compares a value of the first detection signal PW_INDEX received from the detection circuit 150 to the synchronization signal Vsync, so as to control the output current signal OUT1 generated by the motor driving circuit 130, and to control the rotate speed of the fluorescent color wheel 160 driven by the motor 140.

In structure, the processor 110 is electrically coupled to the motor driver chip 131 and the resistor-capacitor circuit 171. In some embodiment, the processor 110 can communicate with the motor driver chip 131 through the serial interface SSP (Synchronous Serial Port; SSP).

In function, the processor 110 provides a pulse width modulation signal PWM to the resistor-capacitor circuit 171, and the resistor-capacitor circuit 171 generates and provides the direct current signal DC, according to the pulse width modulation signal PWM, to the motor driver chip 131.

The processor 110 is further configured to control the motor driver chip 131 through the serial interface SSP according to the frequency of the synchronization signal Vsync, and the motor driver chip 131 generates the output current signal OUT2 to the motor 141 according to the frequency of the synchronization signal Vsync. The motor 141 drive the color filter wheel 161 to rotate according to the output current signal OUT2. The detection circuit 151 is configured to detect the second detection signal CW_INDEX from the color filter wheel 161 according to the rotation of the color filter wheel 161.

The processor 110 compares a value of the second detection signal CW_INDEX received from the detection circuit 151 to the synchronization signal Vsync, so as to control the output current signal OUT2 provided by the motor driver chip 131 and to control the rotate speed of the color filter wheel 161 driven by the motor 141. In some embodiment, the values the first detection signal PW_INDEX and the second detection signal CW_INDEX can be respectively indicated to pulse numbers of the first detection signal PW_INDEX and the second detection signal CW_INDEX in each cycle. And, the pulse numbers of the first detection signal PW_INDEX and the second detection signal CW_INDEX in each cycle can be respectively considered as rotating speeds of the fluorescent color wheel 160 and the color filter wheel 161.

For example, when the frequency of the synchronization signal Vsync is at a first frequency (such as, 58 Hz), a pulse number of the first detection signal PW_INDEX detected by the detection circuit 150 in a cycle is a first value (such as, 58 pulses). After the frequency of the synchronization signal Vsync changes from the first frequency (such as, 58 Hz) to the second frequency (such as, 60 Hz), a pulse number of the first detection signal PW_INDEX in a cycle detected by the detection circuit 150 can be considered as a second value of the embodiments. The second value can be a variation value (such as, 58~60 pulses). At the beginning of the frequency of the synchronization signal Vsync changes, the second value may be equal or similar to the first value.

After the frequency of the synchronization signal Vsync changes from the first frequency (such as, 58 Hz) to the second frequency (such as, 60 Hz), the microcontroller 120 controls the motor driving circuit 130 to adjust the output current signal OUT1, such that a ratio (such as, 58/58=1) of the first frequency (such as, 58 Hz) to the first value (such as, 58 pulses) can be adjusted to be equal to a ratio (such as 60/60=1) of the second frequency (such as, 60 Hz) to a second value (such as, 60 pulses), and the ratio of the frequency of the synchronization signal Vsync to the value of the first detection signal PW_INDEX can be maintained at a constant value (such as, 1).

Similarly, when the frequency of the synchronization signal Vsync is at the first frequency (such as, 58 Hz), a pulse number of the second detection signal CW_INDEX i detected by the detection circuit 151 in a cycle has a third value (such as, 58 pulses). After the frequency of the synchronization signal Vsync changes from the first frequency (such as, 58 Hz) to the second frequency (such as, 60 Hz), a number of pulses of the second detection signal CW_INDEX detected by the detection circuit 151 in a cycle can be considered as a fourth value of the embodiments. The fourth value can be a variation value (such as, 58~60 pulses). At the beginning of the frequency of the synchronization signal Vsync changes, the fourth value may be equal or similar to the first value.

And, after the frequency of the synchronization signal Vsync changes from the first frequency to the second frequency, the processor 110 controls the motor driver chip 131 to adjust the output current signal OUT2, such that a ratio (such as, 58/58=1) of the first frequency (such as, 58 Hz) to the third value (such as, 58 pulses) can be adjusted to be equal to a ratio (such as 60/60=1) of the second frequency (such as, 60 Hz) to the fourth value (such as, 60 pulses), and the ratio of the frequency of the synchronization signal Vsync to the value of the second detection signal CW_INDEX can be maintained at a constant value (such as, 1).

As a result, when the synchronization signal Vsync changes, the microcontroller 120 compares the synchronization signal Vsync to the first detection signal PW_INDEX, and the processor 110 compares the synchronization signal Vsync to the second detection signal CW_INDEX, so as to control the output current signal OUT1 which has larger amplitude of voltage provided for motor 140 and to control the output current signal OUT2 which has smaller amplitude of voltage provided for the motor 141, respectively, so as to decrease the speed error and phase bias between the fluorescent color wheel 160 and the color filter wheel 161 until the rotating speeds and phases of the fluorescent color wheel 160 and the color filter wheel 161 are the same.

Figure 2A:
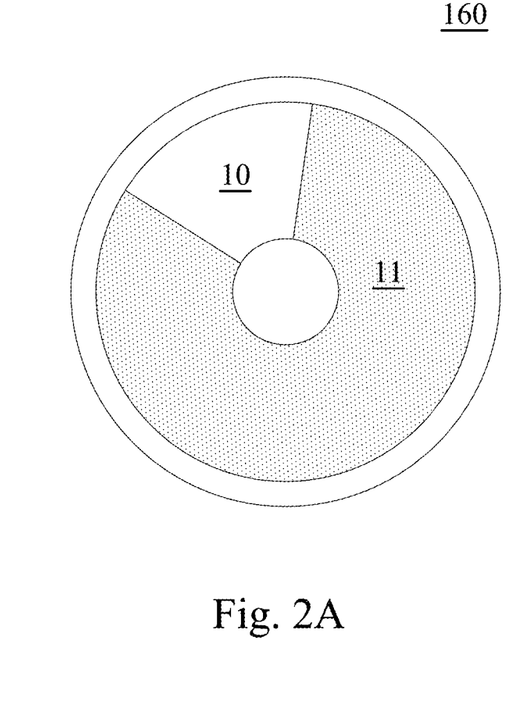
FIG. 2A is a schematic diagram of a fluorescent color wheel in FIG. 1 in accordance with one embodiment of the present disclosure.
Figure 2B:
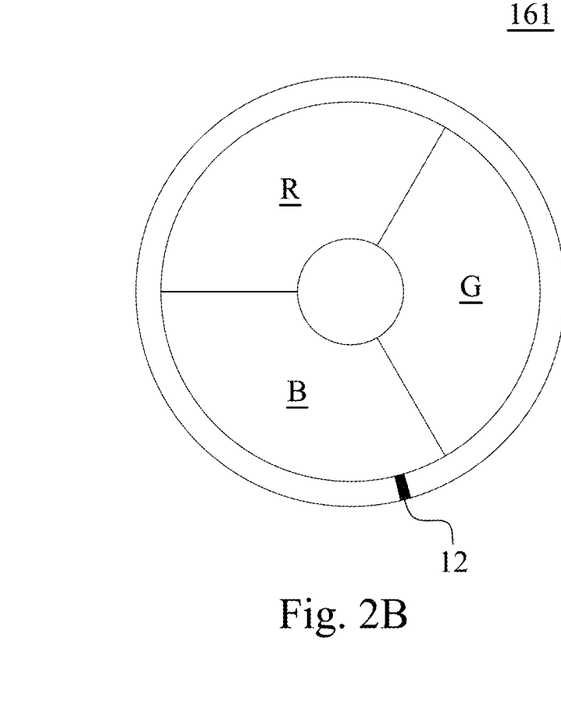
FIG. 2B is a schematic diagram of a color filter wheel in FIG. 1 in accordance with one embodiment of the present disclosure.

For better understanding, how to detect the rotations of the fluorescent color wheel 160 and the color filter wheel 161 be the detection circuits 150 and 151 to generate the first detection signal PW_INDEX and the second detection signal CW_INDEX will be described in the following embodiments. A description is provided with reference to FIGS. 2A and 2B. FIG. 2A is a schematic diagram of a fluorescent color wheel 160 in FIG. 1 in accordance with one embodiment of the present disclosure. FIG. 2B is a schematic diagram of a color filter wheel 161 in FIG. 1 in accordance with one embodiment of the present disclosure.

As shown in FIG. 2A, the fluorescent color wheel 160 is composed of a phosphor region 11 and a transparent region 10. In some embodiments, the detection circuit 150 can generate the first detection signal PW_INDEX according to the reflection of the light emitted by the detection circuit 150 (the light passes through the transparent region 10 or a reflection occurs on the phosphor region 11). In other embodiments, the fluorescent color wheel 160 includes an index mark. The detection circuit 150 can detect the whether the light emitted by the detection circuit 150 is reflected from the index mark, and the detection circuit 150 correspondingly generates the first detection signal PW_INDEX. Therefore, it is not intended to limit the present disclosure.

Specifically, when the detection circuit 150 does not detect the reflection of the light emitted by itself (such as, the light pass through the transparent region 10), the detection circuit 150 generates the detection signal at high logic level. When the detection circuit 150 detects the reflection of the light emitted by itself, (such as, a reflection of the light incident to the phosphor region 11 or the index mark), the detection circuit 150 generates the detection signal at low logic level.

As a result, the processor 110 and the microcontroller 120 can calculate the rotation speed of the fluorescent color wheel 160 according to the logic level of the first detection signal PW_INDEX. As shown in FIG. 2B, the color filter wheel 161 includes a red segment R, a green segment G and a blue segment B. And, the color filter wheel 161 includes a target label 12. The detection circuit 151 is configured to detect whether the light emitted by itself is reflected by the target label 12 to generate a reflected light, so as to generate the second detection signal CW_INDEX. In some embodiments, when the detection circuit 151 detects the light emitted by itself is reflected by the target label 12, the detection circuit 151 generates the second detection signal CW_INDEX at high logic level, and when the detection circuit 151 cannot detect the reflected light reflected by the target label 12, the detection circuit 151 generates the second detection signal CW_INDEX at low logic level. Similarly, the processor 110 and the microcontroller 120 can calculate the rotation speed of the color filter wheel 161 according to the logic level of the second detection signal CW_INDEX.

In some embodiments, the fluorescent color wheel 160 is configured to receive a blue ray, and if the blue ray is incident to the phosphor region 11 of the fluorescent color wheel 160, the phosphor of the phosphor region 11 excites the blue ray to the yellow ray, and the yellow ray are filtered out to the red, green and blue lights through the red segment R, the green segment G and blue segment B of the color filter wheel 161 at the backend.

Figure 3:
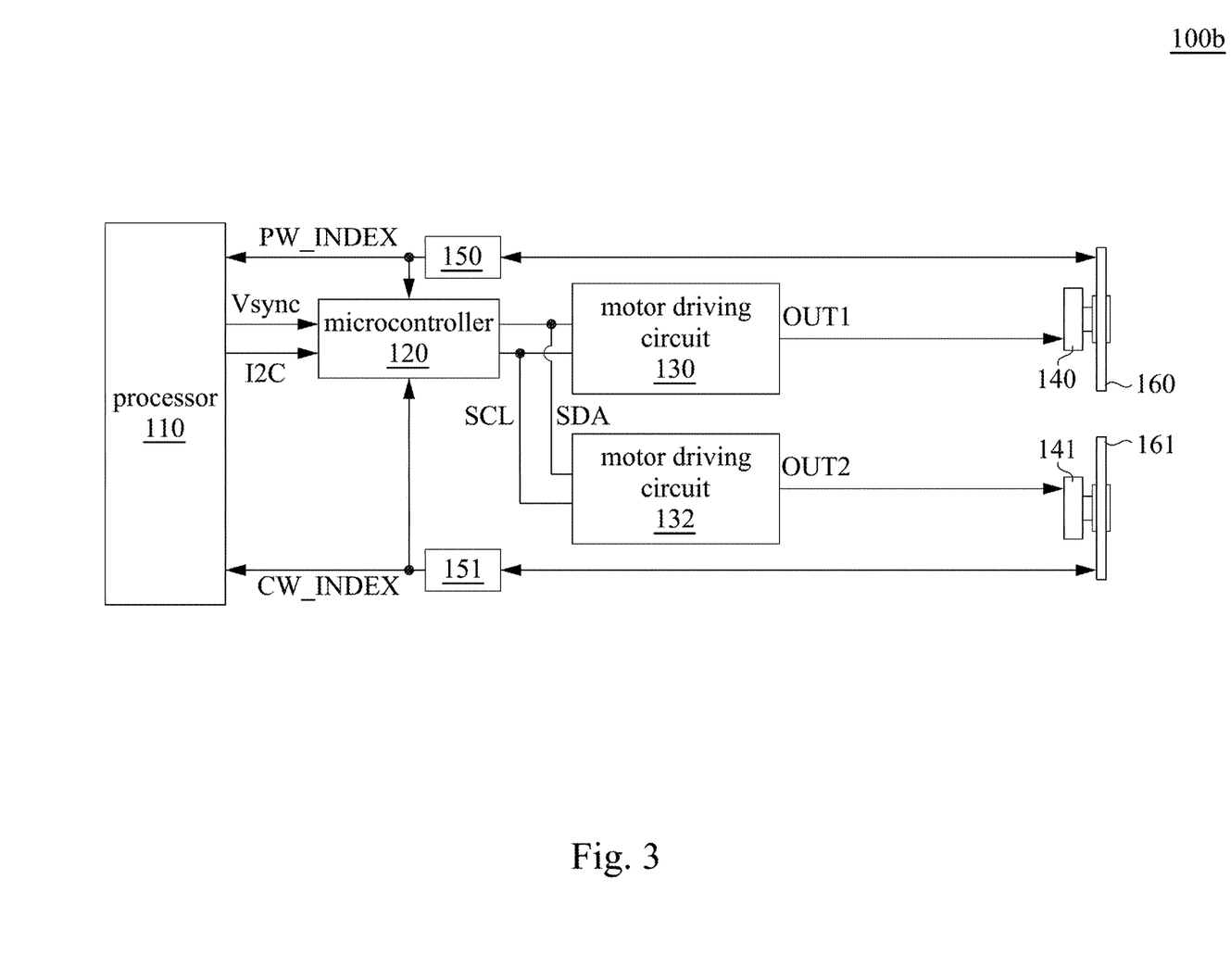
FIG. 3 is a schematic diagram of a function block of a laser lighting system in accordance with one embodiment of the present disclosure.

A description is provided with reference to FIG. 3. FIG. 3 is a schematic diagram of a function block of a laser lighting system 100b in accordance with one embodiment of the present disclosure. As shown in FIG. 3, the laser lighting system 100b includes a processor 110, a microcontroller 120, motor driving circuits 130 and 132, motors 140 and 141, a fluorescent color wheel 160, a color filter wheel 161 and detection circuits 150 and 151.

In structure, the processor 110 is electrically coupled to the microcontroller 120. In function, the processor 110 is configured to generate and provide a synchronization signal Vsync to the microcontroller 120. In some embodiments, the processor 110 can communicate with the microcontroller 120 through inter-integrated circuit.

In structure, the microcontroller 120 is electrically coupled to the motor driving circuit 130 and motor driver chip 131 through a serial data line SDA and a serial clock line SCL. The motor driving circuit 130 is electrically coupled to the motor 140. The motor driving circuit 132 is electrically coupled to the motor 141. In function, the microcontroller 120 is electrically coupled to the motor 141. In function, the microcontroller 120 controls the motor driving circuit 130 and motor driver chip 131 through the serial data line SDA and the serial clock line SCL, to generate output current signals OUT1 and OUT2, according to a frequency of the synchronization signal Vsync. The output current signals OUT1 and OUT2 are respectively configured to drive the motors 140 and 141.

In structure, each of the detection circuits 150 and 151 is electrically coupled to the processor 110 and the microcontroller 120. In function, the detection circuit 150 is configured to detect the first detection signal PW_INDEX from the fluorescent color wheel 160 according to the rotation of the fluorescent color wheel 160, and the detection circuit 151 is configured to detect the second detection signal CW_INDEX from the color filter wheel 161 according to the rotation of the color filter wheel 161.

The microcontroller 120 can compare the first detection signal PW_INDEX and the second detection signal CW_INDEX received from the detection circuits 150 and 151 to the synchronization signal Vsync, respectively, so as to control the output current signal OUT1 for driving the fluorescent color wheel 160 and the output current signal OUT2 for driving the color filter wheel 161. In some embodiment, the values the first detection signal PW_INDEX and the second detection signal CW_INDEX can be respectively indicated to pulse numbers of the first detection signal and the second detection signal CW_INDEX in each cycle. And, the pulse numbers of the first detection signal PW_INDEX and the second detection signal CW_INDEX in each cycle can be respectively considered as rotating speeds of the fluorescent color wheel 160 and the color filter wheel 161.

For example, when the frequency of the synchronization signal Vsync is at a first frequency (such as, 58 Hz), a pulse number of the first detection signal PW_INDEX detected by the detection circuit 150 in a cycle has a first value (such as, 116 pulses), and a pulse number of the second detection signal CW_INDEX detected by the detection circuit 151 in a cycle has a third value (such as, 116 pulses).

After the frequency of the synchronization signal Vsync changes from the first frequency (such as, 58 Hz) to the second frequency (such as, 60 Hz), a pulse number of the first detection signal PW_INDEX detected by the detection circuit 150 in a cycle has a second value, and a pulse number of the second detection signal CW_INDEX detected by the detection circuit 151 in a cycle has a fourth value. The second value and the fourth value can be considered as variation values (such as, 116~120 pulses). At the beginning of the frequency of the synchronization signal Vsync changes, the second value may be equal or similar to the first value and the fourth value may be equal or similar to the third value.

And, after the frequency of the synchronization signal Vsync changes from the first frequency (such as, 58 Hz) to the second frequency (such as, 60 Hz), the microcontroller 120 controls the motor driving circuit 130 to adjust the output current signal OUT1, such that a ratio (such as, 58/116=0.5) of the first frequency (such as, 58 Hz) to the first value (such as, 116 pulses) can be adjusted to be equal to a ratio (such as 60/120=0.5) of the second frequency (such as, 60 Hz) to the second value (such as, 120 pulses), and the ratio of the frequency of the synchronization signal Vsync to the value of the first detection signal PW_INDEX can be maintained at a constant value (such as, 0.5). And the microcontroller 120 controls the motor driving circuit 132 to adjust the output current signal OUT2 to adjust a ratio (such as, 58/116=0.5) of the first frequency (such as, 58 Hz) over the third value (such as, 116 pulses) to be equal to be a ratio (such as 60/120=0.5) of the second frequency (such as, 60 Hz) over the fourth value (such as, 120 pulses), and the ratio of the frequency of the synchronization signal Vsync to the value of the second detection signal CW_INDEX can be maintained at a constant value (such as, 0.5). In some embodiments, the constant value of the ratio can be adjusted by operation demands, such as the input signal, corresponding to the synchronization signal Vsync, switched from the two-dimensional signal to the three-dimensional signal.

As a result, when the synchronization signal Vsync changes, the microcontroller 120 can compare the synchronization signal Vsync to the first detection signal PW_INDEX and the second detection signal CW_INDEX, respectively, so as to control the output current signal OUT1 with a relatively large voltage amplitude provided for the motor 140 and the output current signal OUT2 with a relatively small voltage amplitude provided for the motor 141, in order to reduce the rotating speed and the phase error between the fluorescent color wheel 160 and the color filter wheel 161 until the rotating speeds and the phases between the fluorescent color wheel 160 and the color filter wheel 161 are synchronization.

Figure 4:
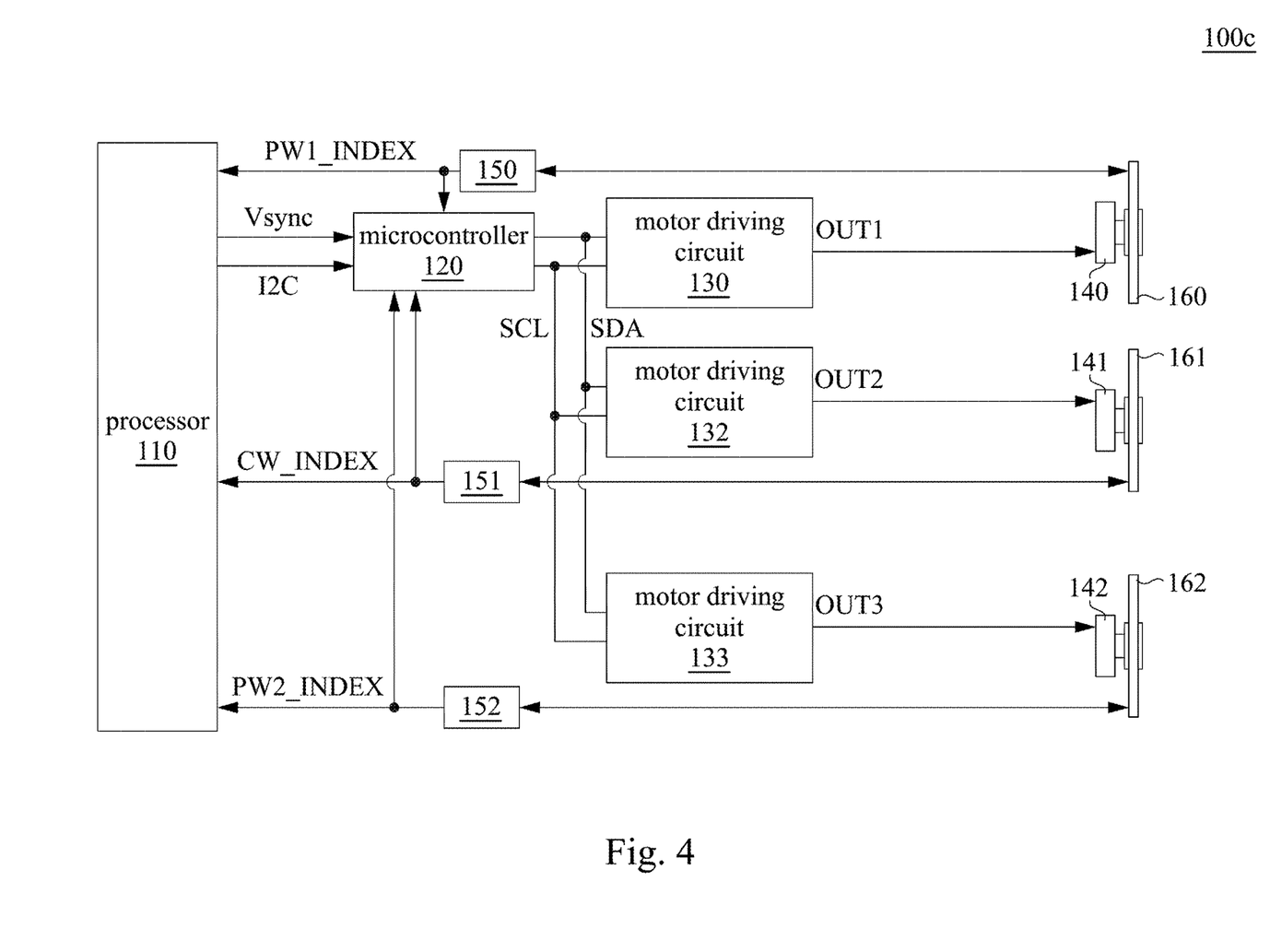
FIG. 4 is a schematic diagram of a function block of a laser lighting system in accordance with one embodiment of the present disclosure.

A description is provided with reference to FIG. 4. FIG. 4 is a schematic diagram of a function block of a laser lighting system 100c in accordance with one embodiment of the present disclosure. As shown in FIG. 4, the laser lighting system 100c includes a processor 110, a microcontroller 120, motor driving circuits 130, 132 and 133, motors 140, 141 and 142, fluorescent color wheels 160 and 162, color filter wheel 161 and detection circuits 150, 151 and 152. In some embodiments, each of the fluorescent color wheels 160 and 162 has a fin structure or a heat dissipation structure, and each of the fluorescent color wheels 160 and 162 is heavier than the color filter wheel 161. In other word, the color filter wheel 161 is lighter than each of the fluorescent color wheels 160 and 162.

In structure, the processor 110 is electrically coupled to the microcontroller 120 and the detection circuits 150, 151 and 152. In function, the processor 110 provides a synchronization signal Vsync to the microcontroller 120. In some embodiments, the processor 110 can communicate with the microcontroller 120 through an inter-integrated circuit.

In structure, the microcontroller 120 is electrically coupled to the motor driving circuits 130, 132 and 133 through a serial data line SDA and a serial clock line SCL. The motor driving circuit 130 is electrically coupled to the motor 140. The motor driving circuit 132 is electrically coupled to the motor 141. The motor driving circuit 133 is electrically coupled to the motor 142. In functions, the microcontroller 120 controls the motor driving circuits 130, 132 and 133 through the serial data line SDA and the serial clock line SCL to generate the output current signals OUT1, OUT2 and OUT3 for driving the motors 140, 141 and 142 according to the frequency of the synchronization signal Vsync, such that the motors 140, 141 and 142 can drive the fluorescent color wheels 160 and 162 and the color filter wheel 161 to rotate according to the output current signals OUT1, OUT2 and OUT3, respectively.

In structure, the detection circuits 150, 151 and 152 are respectively electrically coupled to the microcontroller 120 and the processor 110. In function, each of the detection circuits 150, 151 and 152 is electrically coupled to the microcontroller 120 and the processor 110. In function, the detection circuit 150 is configured to detect the first detection signal PW1_INDEX from the fluorescent color wheel 160 according to the rotation of the fluorescent color wheel 160. The detection circuit 151 is configured to detect the second detection signal CW_INDEX from the color filter wheel 161 according to the rotation of the color filter wheel 161. The detection circuit 152 is configured to detect the third detection signal PW2_INDEX from the fluorescent color wheel 162 according to the rotation of the fluorescent color wheel 162.

The microcontroller 120 can respectively compare the first detection signal PW1_INDEX, the second detection signal CW_INDEX and the third detection signal PW2_INDEX received from the detection circuits 150, 151 and 152 to the synchronization signal Vsync, so as to control the motor driving circuit 130 to adjust the output current signal OUT1, and to control the motor driving circuits 132 and 133 to respectively adjust the output current signals OUT2 and OUT3, in order to control the rotation speeds of the fluorescent color wheel 160, the color filter wheel 161 and the fluorescent color wheel 162 driven by the motors 140, 141 and 142, respectively, according to the output current signals OUT1, OUT2 and OUT3.

For example, when the frequency of the synchronization signal Vsync is at a first frequency (such as, 60 Hz), a pulse number of the first detection signal PW1_INDEX detected by the detection circuit 150 in a cycle has a first value (such as, 60 pulses), and a pulse number of the second detection signal CW_INDEX detected by the detection circuit 151 in a cycle has a third value (such as, 60 pulses). A pulse number of the third detection signal PW2_INDEX detected by the detection circuit 152 in a cycle has a fifth value (such as, 60 pulses).

After the frequency of the synchronization signal Vsync changes from the first frequency (such as, 60 Hz) to the second frequency (such as, 120 Hz), a pulse number of the first detection signal PW1_INDEX detected by the detection circuit 150 in a cycle can be considered as a second value, and a pulse number of the second detection signal CW_INDEX in a cycle detected by the detection circuit 151 can be considered as a fourth value. A pulse number of the third detection signal PW2_INDEX detected by the detection circuit 152 in a cycle can be considered as a sixth value. The second value, the fourth value and the sixth value can be considers as variation values (such as, 60~120 pulses). At the beginning of the frequency of the synchronization signal Vsync changes, the second value may be equal or similar to the first value.

And, after the frequency of the synchronization signal Vsync changes from the first frequency (such as, 60 Hz) to the second frequency (such as, 120 Hz), the microcontroller 120 controls the motor driving circuit 130 to adjust the output current signal OUT1, such that a ratio (such as, 60/60=1) of the first frequency (such as, 60 Hz) to the first value (such as, 60 pulses) can be adjusted to be equal to a ratio (such as 120/120=1) of the second frequency (such as, 120 Hz) to the second value (such as, 120 pulses), and the ratio of the frequency of the synchronization signal Vsync to the value of the first detection signal PW1_INDEX can be maintained at a constant value (such as, 1). And the microcontroller 120 controls the motor driving circuit 132 to adjust the output current signal OUT2, such that a ratio (such as, 60/60=1) of the first frequency (such as, 60 Hz) to the third value (such as, 60 pulses) can be adjusted to be equal to a ratio (such as 120/120=1) of the second frequency (such as, 120 Hz) to the fourth value (such as, 120 pulses), and the ratio of the frequency of the synchronization signal Vsync to the value of the second detection signal CW_INDEX can be maintained at a constant value (such as, 1).

Similarly, after the frequency of the synchronization signal Vsync changes from the first frequency (such as, 60 Hz) to the second frequency (such as, 120 Hz), the microcontroller 120 controls the motor driving circuit 132 to adjust the output current signal OUT3, such that a ratio (such as, 60/60=1) of the first frequency (such as, 60 Hz) to the fifth value (such as, 60 pulses) can be adjusted to be equal to a ratio (such as 120/120=1) of the second frequency (such as, 120 Hz) to the sixth value (such as, 120 pulses), and the ratio of the frequency of the synchronization signal Vsync to the value of the third detection signal PW2_INDEX can be maintained at a constant value (such as, 1).

As a result, when the frequency of the synchronization signal Vsync changes, the microcontroller 120 controls the motor driving circuits 130, 132 and 133 to adjust the output current signals OUT1~OUT3 to maintain the ratio of the frequency of the synchronization signal Vsync to each of the detection signals CW_INDEX, PW1_INDEX and PW2_INDEX. Furthermore, when the frequency of the synchronization signal Vsync changes, the microcontroller 120 is further configured to control the motor driving circuit 130 to adjust the output current signals OUT1 and OUT3, such that the ratios of the frequency of the synchronization signal Vsync to each detection signals PW1_INDEX and PW2_INDEX are equal to each other.

In some embodiments, one projector can be equipped with more fluorescent color wheels (such as 6, 7 or 8 fluorescent color wheels), so as to improve the brightness of the projection image. Therefore, it is not intended to limit the present disclosure.

In the aforementioned embodiments, the frequency of the synchronization signal Vsync may be floated within a small range, such as 58~60 Hz. In other hand, the frequency of the synchronization signal switched from the first frequency to the second frequency can be in a case that the frequency changes greatly when the 2D video signal is switched to the 3D video signal. Meanwhile, the microcontroller 120 is utilized to compare the detection signals (such as first detection signal PW_INDEX, the second detection signal CW_INDEX and the third detection signal PW2_INDEX) to the synchronization signal Vsync, and the microcontroller 120 controls the rotation speeds of each of wheels (such as the color filter wheel 161 and the fluorescent color wheels 160 and 162), so as to synchronize the phase and rotation speeds (or operation frequency) of each color filter wheel and fluorescent color wheels when the synchronization signal Vsync changes.

Summary, when the synchronization signal Vsync changes, the microcontroller 120 in the present disclosure can compare the synchronization signal Vsync to the first detection signal PW_INDEX, and the microcontroller 120 controls the motor driving circuit 130 to adjust the output current signal OUT1 which has relatively large voltage value for driving the motor 140, so as to reduce the phase error between the first detection signal PW_INDEX and the synchronization signal Vsync until the phase difference of the first detection signal PW_INDEX and the synchronization signal Vsync is maintained at a constant value (or a default value). And, in the present disclosure, the microcontroller 120 in the laser lighting system is electrically coupled to the motor driving circuits 130, 132 and 133 through the serial data line SDA and the serial clock line SCL, in order to increase control efficiency, reduce the cost of the circuit and decrease circuit area. Furthermore, in the present disclosure, the single microcontroller 120 can synchronize the rotation speed of each color filter wheel (such as, the color filter wheel 161 and the fluorescent color wheels 160 and 162), simultaneously, in order to improve control efficiency.

Although specific embodiments of the disclosure have been disclosed with reference to the above embodiments, these embodiments are not intended to limit the disclosure. Various alterations and modifications may be performed on the disclosure by those of ordinary skills in the art without departing from the principle and spirit of the disclosure. Thus, the protective scope of the disclosure shall be defined by the appended claims.

What is claimed is:

1. A laser lighting system, comprising:
   a processor, configured to provide a synchronization signal;
   a microcontroller;
   a first motor, configured to drive a fluorescent color wheel to rotate;
   a first motor driving circuit, wherein according to a frequency of the synchronization signal, the microcontroller controls the first motor driving circuit to generate a first output current signal to the first motor, and wherein the first motor drives the fluorescent color wheel to rotate according to the first output current signal; and
   a first detection circuit, configured to detect a first detection signal form the fluorescent color wheel according to rotation of the fluorescent color wheel, wherein,
   when the frequency of the synchronization signal changes, the microcontroller controls the first motor driving circuit to adjust the first output current signal, to maintain a ratio of the frequency of the synchronization signal to a value of the first detection signal at a constant value.

2. The laser lighting system of claim 1, wherein the fluorescent color wheel has a fin structure or a heat dissipation structure.

3. A laser lighting system, comprising:
   a microcontroller;
   a plurality of motors, configured to respectively drive a plurality of fluorescent color wheels and a color filter wheel rotate;
   a plurality of motor driving circuits, wherein the microcontroller respectively controls the motor driving circuits to generate a plurality of output current signals to the motors according to a frequency of a synchronization signal, and wherein the motors respectively drive the fluorescent color wheels and the color filter wheel to rotate according to the output current signals; and
   a plurality of detection circuits, configured to respectively detect a plurality of detection signals from the fluorescent color wheels and the color filter wheel according to rotation of each fluorescent color wheels the color filter wheel, wherein,
   when the frequency of the synchronization signal changes, the microcontroller controls the motor driving circuits to adjust the output current signals to maintain a ratio of the frequency of the synchronization signal to a value of each detection signals at a constant value.

4. The laser lighting system of claim 3, wherein the color filter wheel is lighter than each of the fluorescent color wheels.

5. The laser lighting system of claim 3, wherein each of the fluorescent color wheels has a fin structure or a heat dissipation structure.

6. The laser lighting system of claim 3, wherein one of the detection circuits detects one of the detection signals according to a target label of the color filter wheel.

7. The laser lighting system of claim 6, wherein the other part of the detection circuit detects the other part of the of detection signals according to a transparent region of fluorescent color wheels.

8. The laser lighting system of claim 3, wherein the microcontroller compares the detection signals to the synchronization signal, and wherein the microcontroller controls the motor driving circuits to adjust the output current signals to maintain the ratio of the frequency of the synchronization signal to the value of each detection signals at the constant value.

9. The laser lighting system of claim 3, wherein a power of one of the motor driving circuits for generating one of the output current signals to one of the motors corresponding to the color filter wheel is less than each powers of the other part of the motor driving circuits for generating the other part of the output current signals to the other part of the motors corresponding to the fluorescent color wheels.

10. The laser lighting system of claim 3, wherein the microcontroller is connected through a serial data line and a serial clock line to the motor driving circuits.

11. The laser lighting system of claim 3, wherein the microcontroller receive the detection signals from the detection circuit.

12. The laser lighting system of claim 3, wherein each of the fluorescent color wheels comprises a transparent region and a phosphor region, and wherein the color filter wheel comprising a red segment, a green segment and a blue segment.

* * * * *